United States Patent

[11] 3,585,274

| [72] | Inventors | Don R. Tomaszewski |
| | | Afton Township, Washington County; |
| | | Gerald A. Wyatt, Shoreview, both of, Minn. |
| [21] | Appl. No. | 857,940 |
| [22] | Filed | Sept. 15, 1969 |
| [45] | Patented | June 15, 1971 |
| [73] | Assignee | Minnesota Mining and Manufacturing Company |
| | | St. Paul, Minn. |

[54] RELIEF OF DIELECTRIC STRESS IN HIGH VOLTAGE CABLE CONNECTIONS
14 Claims, 10 Drawing Figs.

[52] U.S. Cl.................................................. 174/73, 174/88, 174/142
[51] Int. Cl...................................................... H02g 15/02, H02g 15/08
[50] Field of Search.......................................... 174/73, 88, 127, 14, 142, 143; 310/196

[56] References Cited
UNITED STATES PATENTS

| 1,723,846 | 8/1929 | Eby .............................. | 174/73 |
| 2,174,377 | 9/1939 | Bowden et al. ................ | 174/73 X |
| 2,386,185 | 10/1945 | Beaver et al. ................. | 174/73 |

FOREIGN PATENTS

| 325,259 | 12/1957 | Switzerland.................. | 174/73 |

*Primary Examiner*—Laramie E. Askin
*Attorney*—Kinney, Alexander, Sell, Steldt and Delahunt ABSTRACT: Dielectric stress control at high voltage cable terminations is achieved by surrounding the high stress areas of a high voltage cable with a tube composed of high permittivity homogeneous material including one or more titanates and/or titanium dioxide which tube makes contact at one end with a ground electrode contacting the shielding of the high voltage cable. In a preferred embodiment, the tube also makes contact at the other end with a high voltage electrode making contact with the conductor of the high voltage cable.

INVENTORS
DON R. TOMASZEWSKI
GERALD A. WYATT
BY Kinney, Alexander,
Sell, Steldt & DeLaHunt
ATTORNEYS INVENTORS
DON R. TOMASZEWSKI
GERALD A. WYATT
BY Kinney, Alexander,
Sell, Steldt & DeLaHunt
ATTORNEYS

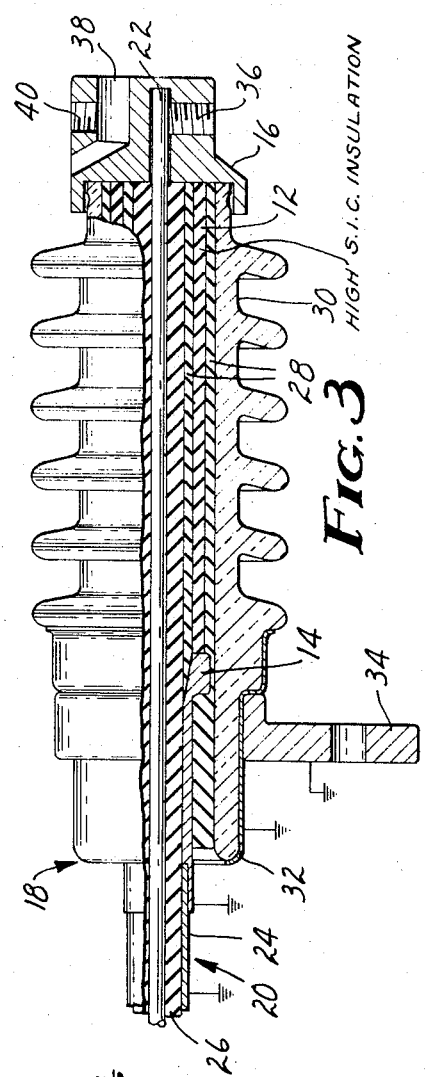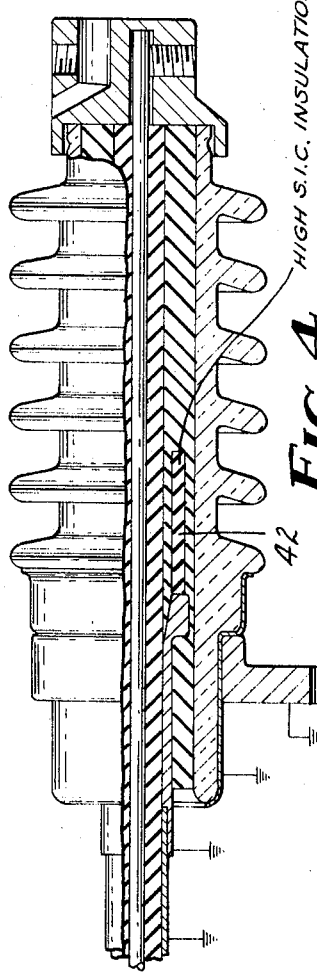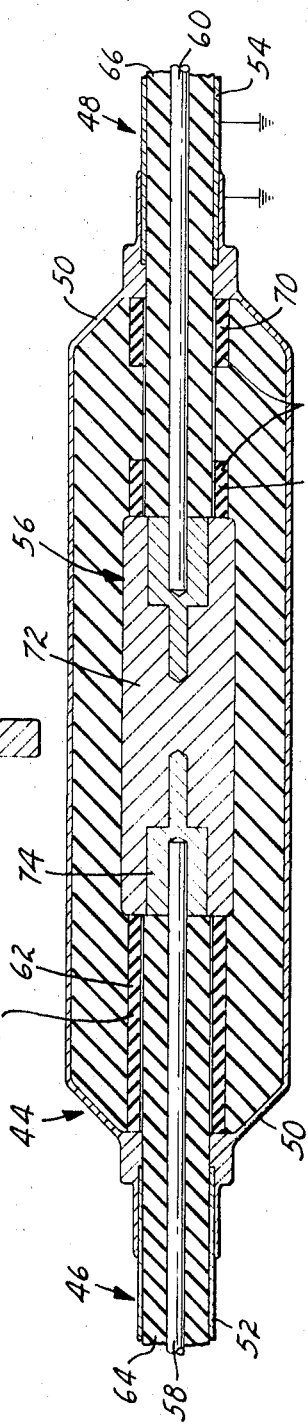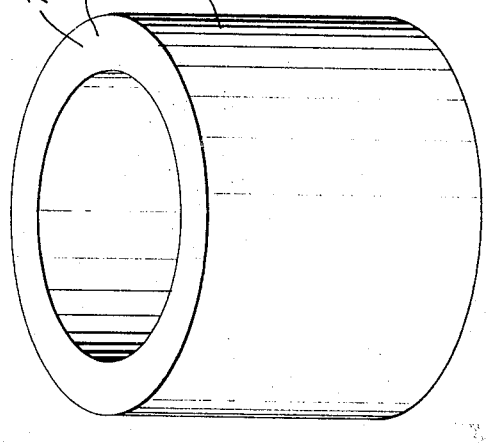

RELIEF OF DIELECTRIC STRESS IN HIGH VOLTAGE CABLE CONNECTIONS

BACKGROUND OF THE INVENTION

This invention relates to high voltage electrical power transmission and distribution and has particular reference to dielectric stress control at high voltage cable terminations. This invention is specifically related to the type of high voltage cable termination wherein a shielded high voltage cable is terminated with the shielding of the cable in contact with a ground electrode.

A number of prior art means for the relief of localized dielectric stresses in electric power transmission lines and systems have been proposed in U.S. Pat. No. 3,349,164 to Wyatt, U.S. Pat. No. 2,745,897 to Nicholas, Great Britain Pat. No. 1,129,887, and in the patents therein noted. These prior art means have generally been directed to controlling dielectric stress by more evenly distributing the gradient of the electric field in the insulation of the high voltage cable at the locality of the ground electrode.

SUMMARY OF THE INVENTION

The present invention provides improved means for relieving dielectric stress relief medium a tube of high permittivity homogeneous material including one or more titanates and/or titanium dioxide, in position for surrounding a high voltage cable and with one end in coaxial contact with a ground electrode in order to provide a more uniform electric field gradient in and outside of the exposed insulation of the high voltage cable. In accordance with the present invention, the geometry of the tube is relatively smooth. Relatively smooth geometry is defined as the type of geometry shown in the various embodiments of the present invention described and illustrated herein as contrasted with the irregular geometry of the stress relief medium described in the above-referenced Nicholas patent. By so combining the features of high permittivity, homogeneity of material, and relatively smooth tubular geometry, the present invention provides an advance over the prior art from the standpoint of a combination of performance and simplicity of construction.

The present invention in one preferred embodiment, provides that the thickness of the tube be greatest at the region of contact of the tube with the ground electrode, and be decreased along the length of the tube away from the ground electrode, thereby providing decreased nonlinearity in the voltage distribution.

The present invention, in another preferred embodiment, provides that the tube at its other end coaxially contact a high voltage electrode positioned for coaxially contacting the conductor of the high voltage cable. This embodiment is preferably employed for applications wherein the rating of the high voltage termination is about 15 Kilovolts or higher. The permittivity of the tube in this embodiment is about at least 50 to 100 times the permittivity of the insulation of the high voltage cable, the minimum being dependent upon the thickness of the tube and the voltage rating of the device to which the high voltage cable is to be connected. While this embodiment is operable with a tube permittivity of about 50, a tube permittivity of at least 200 is preferred. This embodiment is particularly advantageous in combating the arcing effect caused by a combination of rain and the salts of air pollution which settle on exposed high voltage terminals.

The present invention in an alternate preferred embodiment provides that the tube coaxially contact only the ground electrode. This embodiment is preferably employed for applications wherein the rating of the high voltage termination is about 35 Kilovolts or less. The permittivity of the tube in this embodiment is about at least five to 10 times the permittivity of the insulation of the high voltage cable. Again, this minimum is dependent upon the thickness of the tube and the voltage rating of the device to which the high voltage cable is to be connected. While this embodiment is operable with a tube permittivity of about 15, a tube permittivity of at least 30 is preferred. This embodiment is also preferred in those applications wherein the economic requirements make it necessary to use a tube having a smaller quantity of material. In this embodiment, a tube material having a permittivity in this lower range is preferred because a tube material having a higher permittivity would provide greater concentration of the flux lines in the insulation adjacent the exposed end of the tube, thereby making the insulation more susceptible to overloading.

The present invention, in a further embodiment, provides that the tube be comprised of a plurality of annular segments having conductive end coatings, thereby facilitating the manufacture of tubes of particularly large dimension.

The present invention, in still another embodiment, provides means for relieving dielectric stress at a splice of a plurality of shielded and insulated high voltage cables. In this embodiment, a housing is provided having both a ground electrode which is positioned in a housing for coaxially contacting the shielding of each high voltage cable at the splice and a high voltage electrode positioned in the housing for coaxially contacting the conductor of each high voltage cable thereat. Tubes provided in accordance with the present invention are positioned for surrounding an exposed portion of the insulation of each of the high voltage cables at the splice.

In alternative preferred embodiments, each tube coaxially contacts both the ground electrode and the high voltage electrode; each tube surrounding the exposed insulation of a given cable coaxially contacts only a given one of these two electrodes; and two tubes are provided to surround the exposed insulation of each high voltage cable wherein each tube coaxially contacts one of the electrodes but do not contact each other.

In addition to providing an improved means for more uniformly distributing the voltage and diminishing the dielectric stress in and at the locality of the exposed insulation at high voltage terminations, the present invention is readily adaptable for other applications, wherein it is necessary to provide a uniform voltage distribution between a source of high voltage potential and a source of ground voltage potential. For example, an insulator constructed in accordance with the present invention would be useful in uniformly distributing the voltage between the high voltage conductor of a transmission line and the ground electrode of a transmission tower.

The performance of the means of the present invention is graphically illustrated in FIGS. 1 and 2. In FIG. 1, a graph has been prepared showing the voltage distribution along the surface of an exposed insulation at the termination of a high voltage cable. Plots are shown for a condition of no stress relief, wherein the permittivity, "K", equals 1, and for various values of permittivity ranging from 50 a to 1,800 for a tube constructed in accordance with the present invention. The plots were made by means of an analog of a termination of the type shown in FIGS. 3 and 4, which are rated at a line to line voltage of 15 Kilovolts. There is also shown in the graph of FIG. 1 a line 10 which is drawn to illustrate the ideal condition of a linear voltage distribution between the high voltage electrode and the ground electrode over the length of the exposed insulation therebetween. Examining the graph, it is seen that as the permittivity is increased, the ideal situation is more nearly approached.

In FIG. 2, an analog plot is shown in scale drawings which illustrate the electric field in the locality of the ground electrode. FIG. 2a shows the condition wherein no dielectric stress relief medium is provided. The analog plot fig. 2a is drawn to 10 times the scale of the analog plot of FIG. 2b. FIG. 2b illustrates the relatively uniform stress relief which is provided by the means of the present invention. Again, an analog of means constructed as illustrated in FIG. 3 was used in obtaining this plot. The tube material represented in obtaining this plot was largely composed of barium titanate. The tube had a permittivity of about 600.

BRIEF DESCRIPTION OF THE DRAWING

FIG. 2b is an analog plot showing the electric field in the locality of an exposed insulation at the termination of a high voltage cable using dielectric stress control means of the type shown in FIG. 3 wherein the dielectric stress relief medium has a permittivity of about 600. The scale of FIG. 2b is one-tenth that of FIG. 2a.

FIG. 3 shows a preferred embodiment of means for providing dielectric stress control at the termination of a high voltage cable.

FIG. 4 shows an alternative preferred embodiment of the dielectric stress control means shown in FIG. 3, wherein the dielectric stress relief medium is of different dimensions and placement.

FIG. 5 shows a preferred embodiment of means for providing dielectric stress control at a splice of a plurality of high voltage cables.

FIG. 6 shows a segment of a tubular dielectric stress control medium such as that shown in FIGS. 3 to 5.

DESCRIPTION OF THE PREFERRED EMBODIMENT

Figure 1:
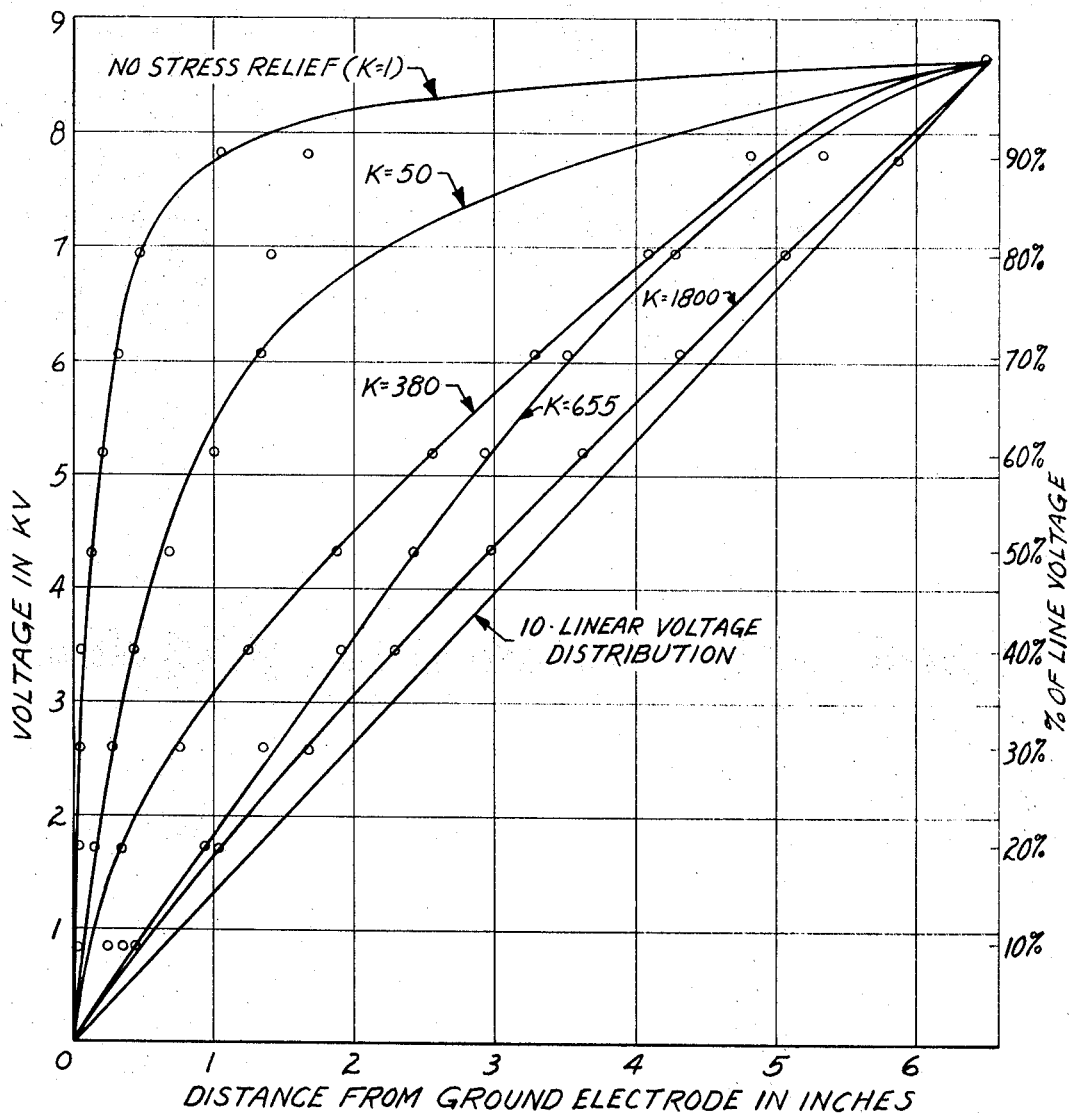
FIG. 1 is a graph showing the voltage distribution along the surface of an exposed insulation at the termination of a high voltage cable using stress control means of the type shown in FIGS. 3 and 4 but with dielectric stress relief media having different permittivities. Curves showing an idealized linear voltage distribution and a voltage distribution wherein no dielectric stress relief medium is provided are also illustrated.

Various preferred embodiments of the present invention are illustrated in FIGS. 3 through 7. These views of these embodiments are not drawn to scale but are illustrative of their general configurations. The pertinent dimensions will be further discussed hereinafter.

Referring to FIG. 3, there is shown a preferred embodiment of the present invention wherein the tubular stress relief medium 12 fully extends from the ground electrode 14 to the high voltage electrode 16. The tube 12, ground electrode 14 and high voltage electrode 16 all have flat surfaces at their respective regions of contact with each other. The ends of the tube 12 are coated with conductive material such as silver to improve contact with the electrodes 14 and 16. The dielectric stress control means 18 is shown in combination with a shielded and insulated high voltage cable 20. The conductor 22 of the cable 20 is coaxially contacted by the high voltage electrode 16. The shielding 24 is coaxially contacted by the ground electrode 14. In the region between the ground electrode 14 and the high voltage electrode 16, an exposed portion of the insulation 26 is surrounded by the tube 12. An insulating dielectric filler 28 such as an elastomer is provided between the tube 12 and the insulation 26 and between the tube 12 and the porcelain housing 30. A conductive glaze 32 is provided on the ground end of the housing. The conductive glaze 32, the ground electrode 14, the shielding 24 and the mounting bracket 34 are each grounded to assure a uniformly grounded voltage potential at the ground electrode end of the housing 30. The high voltage electrode 16 contains a threaded aperture 36 through which a screw may be inserted for securing a conductor 22 to the high voltage electrode 16. The high voltage electrode also contains a conductor aperture 38 and a threaded aperture 40 for facilitating the connection of an outside conductor to the high voltage electrode 16.

The tube 12 is preferably a ceramic material such as a homogeneous composition consisting of at least a major proportion of barium titanate. Ceramic structures of high permittivity are well known in the art, as seen, for example, in U.S. Pat. Nos. 2,429,588 and 2,626,220. A wide range of permittivity values is possible, but where high voltage and minimum space are important, a barium titanate ceramic having a permittivity of at least about 600 is preferred.

The insulating dielectric filler 28 may be a viscous fluid dielectric, such as silicone grease, or solid or elastomeric dielectrics, such as silicone gums, phenol-aldehyde or other resins. The solid or elastomeric dielectrics provide a better support for the tube 12. The tube may also be supported by compressive force elements, such as compression springs (not shown), or by mechanical means such as clamps (not shown).

Figure 2A:
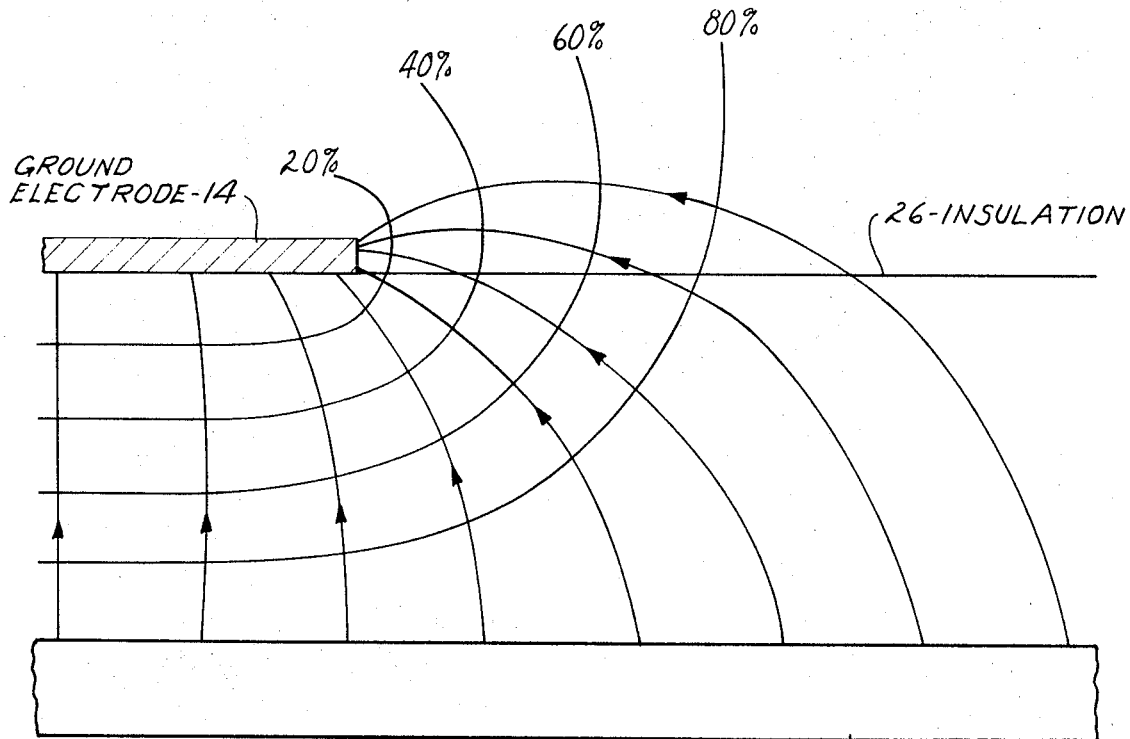
FIG. 2a is an analog plot showing the electric field in the locality of an exposed insulation at the termination of a high voltage cable without the use of any dielectric stress relief medium.
Figure 2B:
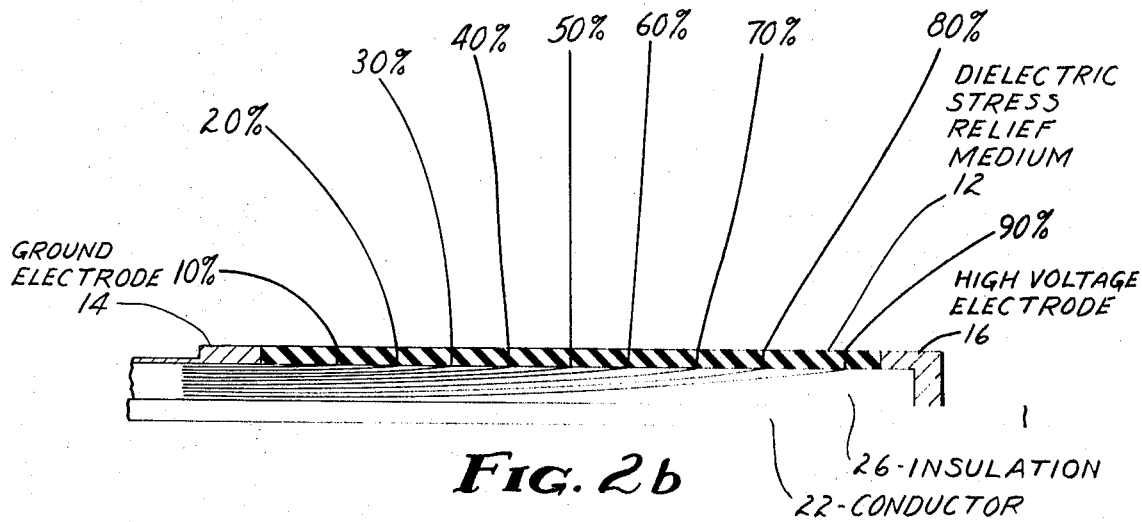

The dimensions of the tube 12 and also those of the termination 18 are dependent upon the voltage rating of the termination 18. A useful rule of thumb is $L=V/ds$ where $L$ is the length of the tube, $V$ is the rated line to neutral voltage, and $ds$ is the dielectric strength of the homogeneous material of the tube. However, the length must also be sufficient to prevent flashover around the porcelain housing 30. For an embodiment such as that shown in FIG. 3, which is designed for application at a terminal rated at 15 kv. line to line voltage (8.7 volt line to neutral voltage), the tube is about 6.5 inches (approximately 16.3 centimeters) in length. The inside diameter is 1.0 inch (approximately 2.5 centimeters) and the tube wall thickness is about 0.187 inch (approximately 4.7 millimeters). The ground electrode 14 and high voltage electrode 16 are made of a good conductor such as copper or brass. The analog plot shown in FIG. 2b was prepared using representation of a termination having the foregoing dimensions and with a high voltage cable composed of a No. 2 gauge stranded copper conductor, covered by 0.175 inch (approximately 4.4 millimeters) thick insulation with a permittivity of 2.5 and a metal shielding inserted therein. The dielectric insulating filler was rubber with a permittivity of 2.5. A tube largely composed of barium titanate and having a permittivity of about 600 was used.

In obtaining the data for the $K=380$, 655 and 1800 curves of the graph of FIG. 1, a representation of the foregoing embodiment of FIG. 3 was used, except that plots were made for these different permittivities. For the $K=1$ (no stress relief) curve shown in FIG. 1 and for the corresponding plot of FIG. 2a, a representation of the foregoing combination was used with the exception that the tube 12 was omitted altogether. For the $K=50$ curve a representation of the embodiment shown in FIG. 4 (discussed below) was used.

Whereas the embodiment shown in FIG. 3 is preferred for 15 kv. applications when the permittivity of the tube is generally greater than 100, the embodiment shown in FIG. 4 is preferred for 15 kv. applications when the permittivity of the tube is less than 100. It is noted from the drawing that the only difference between these embodiments is that the tube 42 of the FIG. 4 embodiment does not extend to and contact the high voltage electrode 16, whereas the tube 12 of the FIG. 3 embodiment does. As the tube length is necessarily increased, tubes of high permittivity are used. For the embodiment of FIG. 4 the tube may be an artificial dielectric such as is described in U.S. Pat. No. 3,287,489 or such as is described by the following formula.

Barium Titanate High K Elastomer:
  100 parts by weight A fluorocarbon elastomer comprising a copolymer of hexafluoropropylene and vinylidene fluoride. The brand used was "Fluorel 2146" Brand elastomer available from Minnesota Mining and Manufacturing Company of St. Paul, Minnesota
  75 parts by weight $BaTiO_3$ analytical reagent
  15 parts by weight MgO
  1.4 parts by weight hexamethylene diamine
  press at 300° F. for 15 minutes
  $K=68$
  Dissipation Factor=0.03
  Dielectric Strength=400 volts per mil Referring to FIG. 5, an embodiment is shown wherein stress relief is provided at a splice of a plurality of high voltage cables. The housing 44 is shown with two high voltage cables 46 and 48 inserted therein. The ground electrode 50 extends throughout the housing 44 and coaxially contacts the shieldings 52 and 54 of the cables 46 and 48 respectively. The high voltage electrode 56 coaxially contacts the conductors 58 and 60 of the respective cables 46 and 48. Although the tubes surrounding an exposed portion of the cable insulation would normally be of the same dimensions, tubes of different dimensions are shown in the embodiment of FIG. 5. The tube 62 which surrounds an exposed portion of the insulation 64 of the cable 46 coaxially contacts both the ground electrode 50 and the high voltage electrode 56. An exposed portion of the insulation 66 of the cable 48, however, is surrounded by two separate tubes 68 and 70 which are separated from contact with one another. This embodiment is preferred in applications wherein: lower voltage rating permits less than optimum design or size or economic considerations prevent use of larger longer tubes.

In another preferred embodiment, only the tube 68 which coaxially contacts the high voltage electrode 56 is included. This embodiment is preferred in applications wherein dielectric stress control is needed only at the high voltage electrode end of the insulation due to use of geometrical stress control at ground electrode.

In still another preferred embodiment, only the tube 70 which coaxially contacts the ground electrode 50 is included. This embodiment is preferred in applications wherein stress concentrations at the high voltage are insufficient to cause breakdown or are otherwise controlled.

The high voltage electrode may consist of two portions 72 and 74 of conductive material, exterior shield socket, and interior connectors, respectively. Alternately a single interior connector with exterior shield may be used. The conductors 58 and 60 are secured in the interior connector portion 74. In other respects, this splice embodiment is constructed of the same materials described for the embodiment shown in FIG. 3.

In embodiments wherein the termination is rated at higher voltages, it is necessary to use longer tubes. In these embodiments, construction methods are such that it is more economical and reliable to provide a tube composed of a plurality of segments such as shown in FIG. 6, wherein the ends of each tube are coated with conductive material 76, such as silver. The tube segments are composed of the same type of high permittivity homogeneous material 78 as is used in the single segment tube embodiments. The conductive coating 76 is only about 0.001 inch (approximately 0.03 millimeter) thick and as a result does not substantially affect the electric field at the termination.

In certain embodiments the ground electrode consists solely of the coating of conductive material on one end of the tube. The cable shielding coaxially contacts this conductive coating.

In one preferred embodiment using a segmented tube, wherein the termination is rated at 69 kv. line to line voltage, seven tube segments (FIG. 6) are used. Each segment is about 3 inches (approximately 17.6 centimeters) in length, about 4.25 inches (approximately 10.6 centimeters) in outside diameter and about 0.5 inch (approximately 1.3 centimeters) thick. The segments largely consist of barium titanate and have a permittivity of about 635. Otherwise this 69 kv. embodiment generally has the configuration shown in FIG. 3, except for those alterations which are well known to those skilled in this art. Such alterations include the provision of conductive retaining caps over the exposed ends of the ground electrode and the high voltage electrode and the enclosure of the entire structure within a support tube having an outside diameter of about 5.5 inches (approximately 13.8 centimeters), supported by the two electrodes, and filled with silicone oil. Spring contact between the adjacent segments is maintained by means of intervening radially fluted annular spring members of 0.02 inch (approximately 0.5 millimeter) spring bronze plate, which is thin enough not to affect the electric field at the termination.

This termination is used with a stranded cable conductor having a diameter of about 0.875 inch (approximately 2.2 centimeters) which is covered by an insulating covering having a 2.5 inch (approximately 6.3 centimeters) diameter and an outer 0.0625 inch (approximately 1.6 millimeters) thick grounded shield. This cable is encased within a plastic jacket to give it a total diameter of about 2.625 inches (approximately 6.5 centimeters). The cable shielding is terminated a distance of about 25.5 inches (approximately 63.8 centimeters) from the end of the conductor. The cable insulation terminates in a conical configuration extending to within 2.25 (approximately 5.6 centimeters) from the end of the conductor and fits tightly within a conical depression in the high voltage electrode into which the end of the conductor is tightly sealed with rubber elastomer.

Figure 7A:
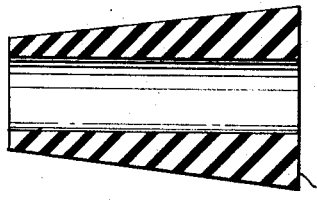
FIGS. 7a, 7b and 7c show alternative preferred embodiments of a tubular dielectric stress control medium such as that shown in FIGS. 3 to 5.
Figure 7B:
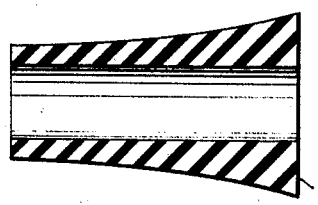
Figure 7C:
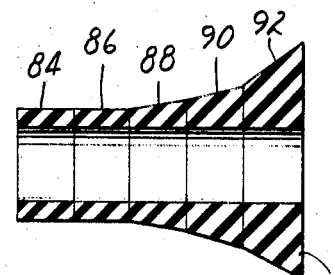

Referring to FIG. 7, there is shown three tube configurations which are used in alternative preferred embodiments wherein the thickness of the tube is decreased along the length of the tube away from the ground electrode. The tubes shown in FIG. 7 are not drawn to scale. In all three tubes, the inside diameter is relatively constant, although this is not essential and should not be construed as a limiting feature. In FIG. 7a, the outside diameter of the tube decreases linearly along its length away from the ground electrode end 80. In FIG. 7b, the outside diameter of the tube decreases nonlinearly along its length away from the ground electrode end 82 with the rate of decrease decreasing with increased distance away from the ground electrode end 82. In FIG. 7c, the tube consists of segments 84, 86, 88, 90, 92. The overall outside diameter is decreased at a decreasing rate along its length away from the ground electrode end 94 as in the embodiment of FIG. 7b, except that segments 84 and 86 are of the same thickness. The decrease in thickness in each of the segments 88, 90, 92, however, is linear.

By making the tubular dielectric stress relief medium thicker at its ground electrode end the slope of the voltage distribution curve (such as those shown in FIG. 1) is decreased in the region immediate to the ground electrode. This decreases the nonlinearity of the voltage distribution without necessarily having to increase the permittivity of the dielectric stress relief medium.

We claim:

1. Means for relieving dielectric stress at a termination of a shielded and insulated high voltage cable, comprising
   a housing defining a hollow section for receiving said high voltage cable;
   a ground electrode positioned in the housing for coaxially contacting the shielding of said high voltage cable; and
   a tube of high permittivity homogeneous material having relatively smooth geometry positioned in the housing with one end of the tube coaxially contacting the ground electrode for surrounding an exposed portion of the insulation of said high voltage cable,
   which homogeneous material substantially includes one or more titanates and/or titanium dioxide.

2. Means for relieving dielectric stress at a termination of a shielded and insulated high voltage cable according to claim 1, further comprising
   a high voltage electrode positioned in the housing for coaxially contacting the conductor of said high voltage cable; and
   wherein the other end of the tube coaxially contacts the high voltage electrode.

3. Means for relieving dielectric stress at a termination of a shielded and insulated high voltage cable comprising
   a housing defining a hollow section for receiving a said high voltage cable;
   a ground electrode positioned in the housing for coaxially contacting the shielding of a said high voltage cable; and
   a tube of high permittivity homogeneous material positioned in the housing for surrounding an exposed portion of the insulation of a said high voltage cable, wherein one end of the tube coaxially contacts the ground electrode, wherein the geometry of the tube is relatively smooth, and wherein the tube comprises a plurality of annular segments having conductive end coatings.

4. Means for relieving dielectric stress at a termination of a shielded and insulated high voltage cable according to claim 3, wherein the thickness of the segments is decreased with increasing distance away from the ground electrode.

5. Means for relieving dielectric stress at a termination of a shielded and insulated high voltage cable comprising
   a housing defining a hollow section for receiving a said high voltage cable;
   a ground electrode positioned in the housing for coaxially contacting the shielding of a said high voltage cable; and
   a tube of high permittivity homogeneous material positioned in the housing for surrounding an exposed portion of the insulation of a said high voltage cable, wherein one end of the tube coaxially contacts the ground electrode, wherein the geometry of the tube is relatively smooth, and wherein the tube is isolated from contact with the conductor of a said high voltage cable and wherein the permittivity of the tube is at least 15.

6. Means for relieving dielectric stress at a termination of a shielded and insulated high voltage cable comprising
   a housing defining a hollow section for receiving a said high voltage cable;
   a ground electrode positioned in the housing for coaxially contacting the shielding of a said high voltage cable;
   a high voltage electrode positioned in the housing for coaxially contacting the conductor of a said high voltage cable; and
   a tube of high permittivity homogeneous material positioned in the housing for surrounding an exposed portion of the tube coaxially contacts the ground electrode, wherein the geometry of the tube is relatively smooth, wherein the other end of the tube coaxially contacts the high voltage electrode, and wherein the permittivity of the tube is at least 50 to 100 times the permittivity of the insulation of a said high voltage cable, the minimum being dependent upon the thickness and the length of the tube.

7. Means for relieving dielectric stress at a termination of a shielded and insulated high voltage cable, comprising
   a housing defining a hollow section for receiving a said high voltage cable;
   a ground electrode positioned in the housing for coaxially contacting the shielding of a said high voltage cable;
   a high voltage electrode positioned in the housing for coaxially contacting the conductor of a said high voltage cable; and
   a tube of high permittivity homogeneous material positioned in the housing for surrounding an exposed portion of the insulation of a said high voltage cable, wherein one end of the tube coaxially contacts the ground electrode, wherein the geometry of the tube is relatively smooth, wherein the other end of the tube coaxially contacts the high voltage electrode, and wherein the permittivity of the tube is at least 50.

8. Means for relieving dielectric stress at a splice of a plurality of shielded and insulated high voltage cables, comprising
   a housing defining hollow sections for receiving each said high voltage cable;
   a ground electrode for coaxially contacting the shielding of each said high voltage cable;
   a high voltage electrode positioned in the housing for coaxially contacting the conductor of each said high voltage cable; and
   a plurality of tubes of high permittivity homogeneous material having relatively smooth geometry and positioned in the housing for surrounding an exposed portion of the insulation of each said high voltage cable,
   wherein one end of each tube coaxially contacts at least one of the electrodes, which homogeneous material substantially includes one or more titanates and/or titanium dioxide.

9. Means for relieving dielectric stress at a splice of a plurality of shielded and insulated high voltage cables according to claim 8, wherein one end of each tube coaxially contacts the ground electrode and the other end of each tube coaxially contacts the high voltage electrode.

10. Means for relieving dielectric stress at a splice of a plurality of shielded and insulated high voltage cables, comprising
    a housing defining hollow sections for receiving each said high voltage cable;
    a ground electrode positioned in the housing for coaxially contacting the shielding of each said high voltage cable;
    a high voltage electrode positioned in the housing for coaxially contacting the conductor of each said high voltage cable; and
    a plurality of tubes of high permittivity homogeneous material positioned in the housing for surrounding an exposed portion of the insulation of each said high voltage cable, wherein one end of each tube coaxially contacts at least one of the electrodes, wherein the geometry of each tube is relatively smooth, and wherein the number of tubes is double the number of hollow sections, wherein each tube coaxially contacts one of the electrodes, and wherein the two tubes in each hollow section are isolated from each other.

11. Means for relieving dielectric stress in the region between a high voltage conductor and a ground electrode, comprising
    a housing;
    a ground electrode
    a high voltage electrode positioned in the housing for contacting a said high voltage conductor; and
    a homogeneous high permittivity material having a relatively smooth geometry and positioned in the housing and contacting both the high voltage electrode and the ground electrode, which homogeneous material substantially includes one or more titanates and/or titanium dioxide.

12. Means for relieving dielectric stress at a splice of a plurality of shielded and insulated high voltage cables, comprising
    a housing defining hollow sections for receiving each said high voltage cable;
    a ground electrode for coaxially contacting the shielding of each said high voltage cable;
    a high voltage electrode positioned in the housing for coaxially contacting the conductor of each said high voltage cable; and
    a plurality of tubes of high permittivity homogeneous material having relatively smooth geometry and positioned in the housing for surrounding an exposed portion of the insulation of each said high voltage cable,
    wherein one end of each tube coaxially contacts at least one of the electrodes, and
    wherein the permittivity of each tube is at least 15.

13. Means for relieving dielectric stress at a splice of a plurality of shielded and insulated high voltage cables according to claim 12,
    wherein one end of each tube coaxially contacts the ground electrode and the other end of each tube coaxially contacts the high voltage electrode, and
    wherein the permittivity of each tube is at least 50.

14. Means for relieving dielectric stress at a splice of a plurality of shielded and insulated high voltage cables, comprising
    a housing defining hollow sections for receiving each said high voltage cable;
    a ground electrode for coaxially contacting the shielding of each said high voltage cable;
    a high voltage electrode positioned in the housing for coaxially contacting the conductor of each said high voltage cable; and
    a plurality of tubes of high permittivity homogeneous material having relatively smooth geometry and positioned in the housing for surrounding an exposed portion of the insulation of each said high voltage cable,
    wherein one end of each tube coaxially contacts at least one of the electrodes, and
    wherein each tube comprises a plurality of annular segments having conductive end coatings.

UNITED STATES PATENT OFFICE
CERTIFICATE OF CORRECTION

Patent No. 3,585,274            Dated June 15, 1971

Inventor(s) Don R. Tomaszewski and Gerald A. Wyatt

It is certified that error appears in the above-identified patent and that said Letters Patent are hereby corrected as shown below:

Column 1, line 26, after "stress" insert -- at high voltage cable terminations by providing as a stress --; and line 44, after "invention" insert -- , --.

Column 2, line 2, after "preferred" (first occurrence) insert -- . --;

line 53, delete "a" (first occurrence); and line 68, after "plot" insert -- of --.

Column 5, line 58, change "17.6" to -- 7.6 --.

Column 6, line 11, after "2.25" insert -- inches --.

Column 7, line 33, after "portion" insert -- of the insulation of a said high voltage cable, wherein one end --.

Signed and sealed this 30th day of May 1972.

(SEAL)
Attest:

EDWARD M. FLETCHER, JR.
Attesting Officer

ROBERT GOTTSCHALK
Commissioner of Patents